US006895749B2

(12) United States Patent
Tohru

(10) Patent No.: US 6,895,749 B2
(45) Date of Patent: May 24, 2005

(54) DOUBLE-ACTING PRESSURE INTENSIFYING CYLINDER AND METHOD FOR INTENSIFYING PRESSURE IN THE CYLINDER

(75) Inventor: Honda Tohru, Sinshiro (JP)

(73) Assignee: Yugenkaisha Honda Seisakusho, Sinshiro (JP)

( * ) Notice: Subject to any disclaimer, the term of this patent is extended or adjusted under 35 U.S.C. 154(b) by 11 days.

(21) Appl. No.: 10/385,673

(22) Filed: Mar. 12, 2003

(65) Prior Publication Data

US 2003/0172652 A1 Sep. 18, 2003

(30) Foreign Application Priority Data

Mar. 12, 2002 (JP) ....................................... 2002-067260

(51) Int. Cl.$^7$ ................................................ B60T 13/58
(52) U.S. Cl. .............................. 60/563; 60/581; 60/591
(58) Field of Search .......................... 60/477, 560, 563, 60/581, 583, 591

(56) References Cited

U.S. PATENT DOCUMENTS 3,875,365 A * 4/1975 Beneteau ..................... 60/560
6,581,379 B2 * 6/2003 Nomura et al. ............... 60/563

FOREIGN PATENT DOCUMENTS

| | | | | |
|---|---|---|---|---|
| DE | 32 36 793 A1 | | 4/1984 | |
| DE | 3236803 A1 | * | 4/1984 | F15B/15/14 |
| DE | 29700887 U1 | * | 3/1997 | F15B/11/08 |
| DE | 297 00 887 U1 | | 4/1997 | |

* cited by examiner

*Primary Examiner*—Thomas E. Lazo
(74) *Attorney, Agent, or Firm*—Antonelli, Terry, Stout & Kraus, LLP

(57) ABSTRACT

A double-acting pressure intensifying cylinder and method, wherein a first cylinder a second cylinder are connected via an operation chamber in series. The first fluid chamber is provided with a first piston and the second fluid chamber is provided with a second piston. In an operation chamber, a rod is slidably inserted. The first fluid chamber has a first fluid supply port and an air port, the second fluid chamber has a third fluid supply port and a fourth fluid supply port, the operation chamber has a second fluid supply port. A check valve is provided wherein the series connected first and second cylinders at a position closer to the second cylinder than to the second fluid supply port in the operation chamber and makes it possible for a fluid such as a hydraulic fluid to flow only in one direction from the operation chamber to the second cylinder.

11 Claims, 9 Drawing Sheets

DOUBLE-ACTING PRESSURE INTENSIFYING CYLINDER AND METHOD FOR INTENSIFYING PRESSURE IN THE CYLINDER

TECHNICAL FIELD

The present invention relates to a hydraulic cylinder, and in particular to a double-acting pressure intensifying cylinder in which a plurality of hydraulic cylinders are coaxially connected in series, and a method for intensifying pressure in the cylinder using the double-acting pressure intensifying cylinder.

PRIOR ART

A hydraulic cylinder is a representative example of an actuator which directly converts hydraulic energy into motion. Various kinds of hydraulic cylinders ranging from the one having a general structure to the one having an extremely special structure are produced and can be utilized in accordance with respective applications and instrument. Among them, a piston type double-acting cylinder is most frequently used. The piston type double-acting cylinder may require a large driving force rather than smooth movement and operating speed of a piston depending on the intended application. The hydraulic energy generated by a hydraulic pressure generation device such as a hydraulic pump and an oil tank is generally transmitted to the hydraulic cylinder via a hydraulic transmission control device such as piping and a valve. In order to increase output of the hydraulic cylinder, the hydraulic energy is preferably transmitted to the hydraulic cylinder via a pressure intensifying device such as a booster.

Problem to be Solved by the Invention

However, in general, the pressure intensifying device and the hydraulic cylinder are separately composed, which makes equipment large and complicated. The separate provision of the pressure intensifying device increases the cost. As the structure becomes more complicated, the rate of occurrence of trouble, such as breakdown, becomes higher. It is also troublesome to deal with the trouble. On the other hand, when trying to increase output without using pressure intensifying device, it is eventually required to increase equipment size by enlarging an inner diameter of the cylinder and the like, which is not preferable.

Accordingly, it is an object of the present invention to provide a compact double-acting pressure intensifying cylinder which can achieve larger driving force, and whose inner diameter can be reduced because an adjustable pressure-intensified stroke can be obtained. It is another object of the present invention to realize the double-acting pressure intensifying device which has a simple structure and is inexpensive and to reduce the occurrence of trouble such as breakdown. It is yet another object of the present invention to provide a method for intensifying pressure in the cylinder using the double-acting pressure intensifying cylinder.

Means for Solving the Problems

The invention provides a double-acting pressure intensifying cylinder comprising a first cylinder having a first piston; a second cylinder integrally connected in series to said first cylinder and having a second piston separated from said first piston; an operation chamber provided in an inner portion of said first cylinder and said second cylinder, having a fluid supply port, and having an inner diameter set to be smaller than inner diameters of said first cylinder and said second cylinder; and a check valve provided at a position which is closer to said second cylinder than to the fluid supply port and which is between said operation chamber and said second piston so as to make it possible for a fluid to flow only in one direction from said first cylinder to said second cylinder, wherein a rod of said first piston cuts off fluid communication between a fluid chamber of said first cylinder and said operation chamber by sliding in said operation chamber, said second piston is stopped at a predetermined position or a given position, and a rod of said first piston is slid continuously and/or intermittently in said operation chamber, a hydraulic fluid is supplied with amount generally equivalent to a volume of said operation chamber into said second cylinder through said check valve, whereby every time said first piston reciprocally slides once, a pressure-intensified stroke with pressure intensified by an amount generally equivalent to the volume of said operation chamber is obtained in said second piston.

The invention as described above, further comprises: a first fluid chamber in said first cylinder is divided into a cap side and a head side by the first piston, a second fluid chamber in said second cylinder is divided into a cap side and a head side by the second piston, wherein said operation chamber is an area where the rod of said first piston slides.

The invention as described above, further comprises: a fluid supply port of said operation chamber is a second fluid supply port, a first fluid supply port is provided on the cap side of said first cylinder and an air port is provided on the head side of said first cylinder, a third fluid supply port is provided on the cap side of said second cylinder and a fourth fluid supply port is provided on the head side of said second cylinder.

The invention as described above provides a hydraulic fluid into a cap side of said first fluid chamber which is supplied through said first fluid supply port, air in the head side of said first fluid chamber is discharged through said air port and said first piston is pushed down, the hydraulic fluid in said operation chamber is supplied into the cap side of said second fluid chamber through said check valve, and the pressure in the cap side of the second fluid chamber is intensified.

The invention as described provides the hydraulic fluid into said operation chamber which is supplied through said second fluid supply port, the hydraulic fluid in the cap side of said first fluid chamber is discharged through said first fluid supply port while air is sucked into the head side of said first fluid chamber through said air port, and then said first piston is pushed up.

The invention as described provides the hydraulic fluid which supplied into said operation chamber and/or the cap side of said second fluid chamber through said second fluid supply port and/or said third fluid supply port and supplying the hydraulic fluid of said operation chamber into the cap side of said second fluid chamber through the check valve, and the hydraulic fluid in the head side of said second fluid chamber is discharged through said fourth fluid supply port and said second piston is pushed down.

The invention as described provides the hydraulic fluid which is supplied into the head side of said second fluid chamber through said fourth fluid supply port, and the hydraulic fluid in the cap side of said second fluid chamber is discharged through said third fluid supply pert and said second piston is pushed up.

The invention as described provides the hydraulic fluid which is filled in the head side of said first fluid chamber, and said air port is changed to a fluid supply port.

The invention as described includes a piston provided on said first cylinder and/or said second cylinder is changed to a plunger or a ram.

The invention as described provides that the inner diameters of said first cylinder and said second cylinder are different.

The invention includes a method for intensifying pressure in a cylinder, comprising: connecting a first cylinder having a first piston to a second cylinder having a second piston integrally in series via an operation chamber in an inner portion, separating said first piston and said second piston, cutting off a rod of said first piston between a fluid chamber of said first cylinder and said operation chamber by sliding in said operation chamber, setting an inner diameter of said operation chamber to be smaller than inner diameters of said first cylinder and said second cylinder, providing a fluid supply port on said operation chamber, providing a check valve in the inner portion at a position which is closer to said second cylinder than to the fluid supply port and which is between said operation chamber and said second piston so as to make it possible for a fluid to flow only in one direction from said first cylinder to said second cylinder, stopping said second piston at a predetermined position or a given position, and sliding the rod of said first piston continuously and/or intermittently in said operation chamber, supplying a hydraulic fluid whose amount is generally equivalent to a volume of said operation chamber into said second cylinder through said check valve, and obtaining a pressure-intensified stroke of which pressure is intensified by an amount generally equivalent to the volume of said operation chamber can be obtained in said second cylinder every time said first piston reciprocally slides once.

A flow of fluid (pressure) from a second cylinder to a first cylinder is cut off by providing a check valve in an operation chamber. When the first cylinder (a first piston) slides, a pressure intensified by a pressure transmitted from the operation chamber to the second cylinder is not reduced. Since this makes it possible to obtain an adjustable pressure-intensified stroke, inner diameters of cylinders can be reduced with an output increased, which contributes to downsizing of cylinders. In addition, a simple structure makes it possible to be inexpensive and to reduce the occurrence of trouble such as breakdown.

Since an output of the double-acting pressure intensifying cylinder is intermittent, it is preferably used for an application in which intermittent movement is required rather than for an application in which smooth movement is required. A fluid chamber in the double-acting pressure intensifying cylinder may have both a space filled with a hydraulic fluid and a space filled with an air. Alternatively, the entire fluid chamber may be filled with the hydraulic fluid. Any component, which slides reciprocally in the cylinder, presses the fluid and transmits the pressure, may be used as long as it operates in the same way and it has the same effect as a piston. A plunger or a ram and the like may be used. Inner diameters of the first cylinder and the second cylinder are not necessarily the same.

A method of intensifying pressure in the cylinder can be performed by providing the check valve. Specifically, it is possible to make the first cylinder serve as a pump thereby stopping the second cylinder (a second piston) at a predetermined position or a given position (an operation starting point) and continuously sliding the first cylinder (the first piston). Therefore, the adjustable pressure-intensified stroke of the second piston can be obtained, and the pressure of the hydraulic fluid in the cap side of the second fluid chamber can be suitably intensified.

EMBODIMENTS OF THE INVENTION

Hereinafter, a preferred embodiment of a double-acting pressure intensifying cylinder according to the present invention will be described.

Figure 1:
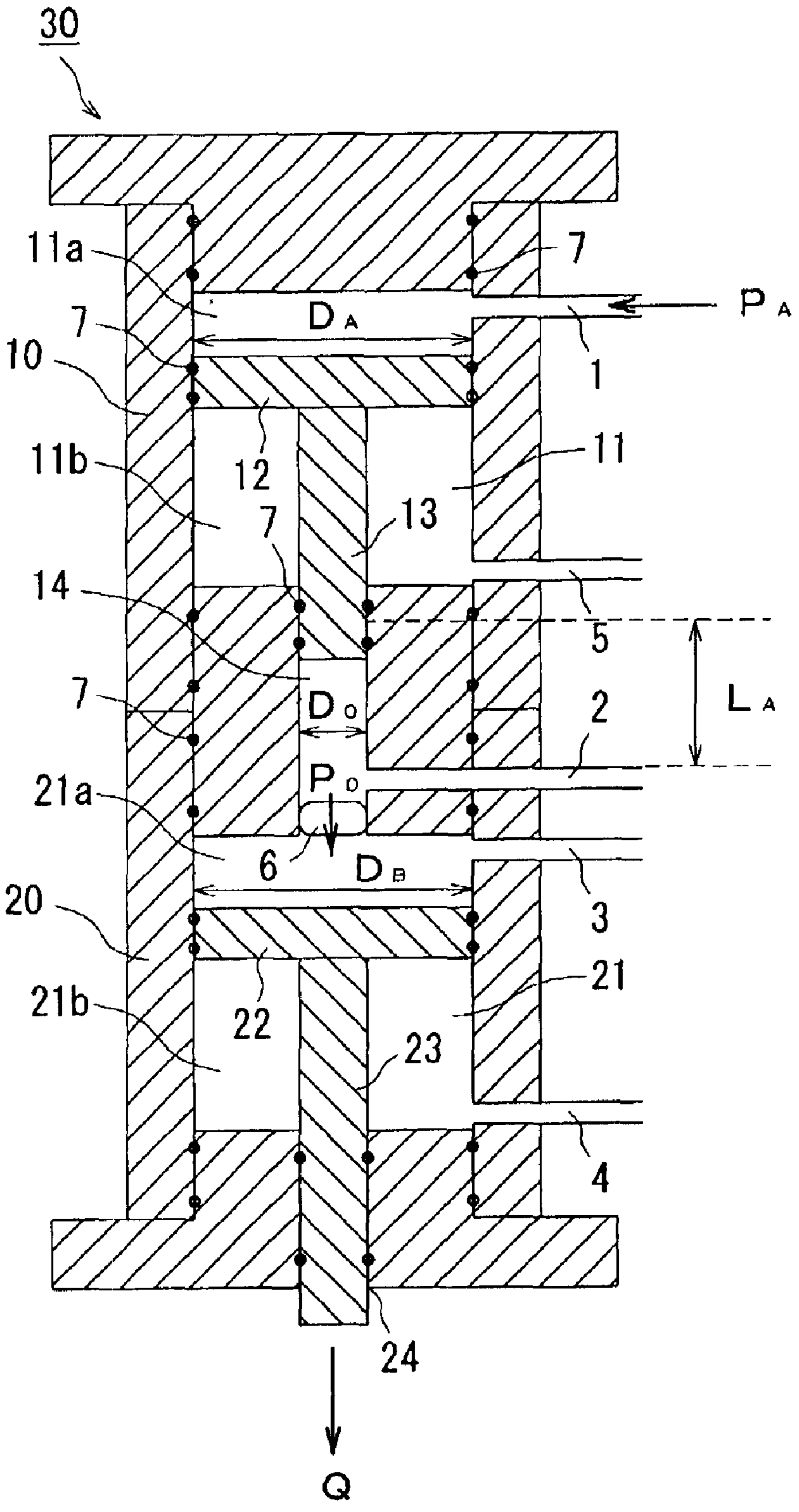
FIG. 1 is a sectional view of a double-acting pressure intensifying cylinder 30 according to the present embodiment.

FIG. 1 is a sectional view of a double-acting pressure intensifying cylinder 30 (hereinafter referred to as a cylinder 30). The cylinder 30 is provided with a first cylinder 10 and a second cylinder 20 which are connected in series. The first cylinder 10 has a first fluid chamber 11, and the second cylinder 20 has a second fluid chamber 21. The first fluid chamber 11 is provided with a first piston 12 and the second fluid chamber 21 is provided with a second piston 22. The first cylinder 10 and the second cylinder 20 is connected via an operation chamber 14, in which a rod 13 of the first piston 12 is slidably inserted. A rod 23 of the second piston 22, which is disposed coaxially with the first piston 12, is constructed so as to be slidably inserted into a sliding hole 24 and a driving force is transmitted to other mechanisms such as a crank shaft connected thereto.

The first fluid chamber 11 is divided into a cap side 11*a* and a head side 11*b* by the first piston 12 and the second fluid chamber 21 is divided into a cap side 21*a* and a head side 21*b* by the second piston 22. A passage for a hydraulic fluid or air is connected to each of the first fluid chamber 11, the second fluid chamber 21 and the operation chamber 14. For example, a first fluid supply port 1 is provided on the cap side 11*a* of the first fluid chamber 11, an air port 5 is provided on the head side 11*b*, a second fluid supply port 2 is provided in the operation chamber 14, a third fluid supply port 3 is provided on the cap side 21*a* of the second fluid chamber 21, and a fourth fluid supply port 4 is provided on head side 21*b*. Although in the cylinder 30 according to the present embodiment, the air port 5 is provided on the head side 11*b* of the first fluid chamber 11, the present invention is not limited to an air port, and a fluid supply port may be provided.

A check valve 6 is provided at the position closer to the second cylinder 20 than to the second fluid supply port 2 in the operation chamber 14. The check valve 6 makes it possible for a fluid such as a hydraulic fluid to flow only in one direction from the first cylinder 10 to the second cylinder 20. Therefore, the construction is made that the check valve 6 prevents an inflow of the hydraulic fluid from the second fluid chamber 21 to the operation chamber 14.

The first fluid supply port 1 to the fourth fluid supply port 4 can be opened and closed, and opening and closing thereof is preferably performed by a solenoid valve such as a directional control valve (not shown) electrically connected to a controller and the like. The first fluid supply port 1 to the fourth fluid supply port 4 are connected to a hydraulic pressure generation device such as a hydraulic pump and an oil tank. The air port 5 is preferably open to atmosphere. Alternatively, it may be opened and closed by the solenoid valve and the like. Seal members 7 are appropriately provided at sliding positions and the like in the first piston 12, the rod 13 and the first cylinder 10, and at sliding positions and the like in the second piston 22, the rod 23 and the second cylinder 20 to prevent the hydraulic fluid from leaking.

Referring to the sectional views of the FIGS. 2 to 8, an operational example of the cylinder 30 will be described. A solid arrow indicates a flow of hydraulic fluid. A dotted arrow indicates a flow of air. An outlined arrow indicates a sliding direction of the first piston 12 and the second piston 22. A mark X indicates the first fluid supply port 1 to the fourth fluid supply port 4 which are closed. The illustration of each of the seal members 7 disposed at various positions of the piston 30 is omitted since it is the same as in FIG. 1.

(1) First Process

Figure 2:
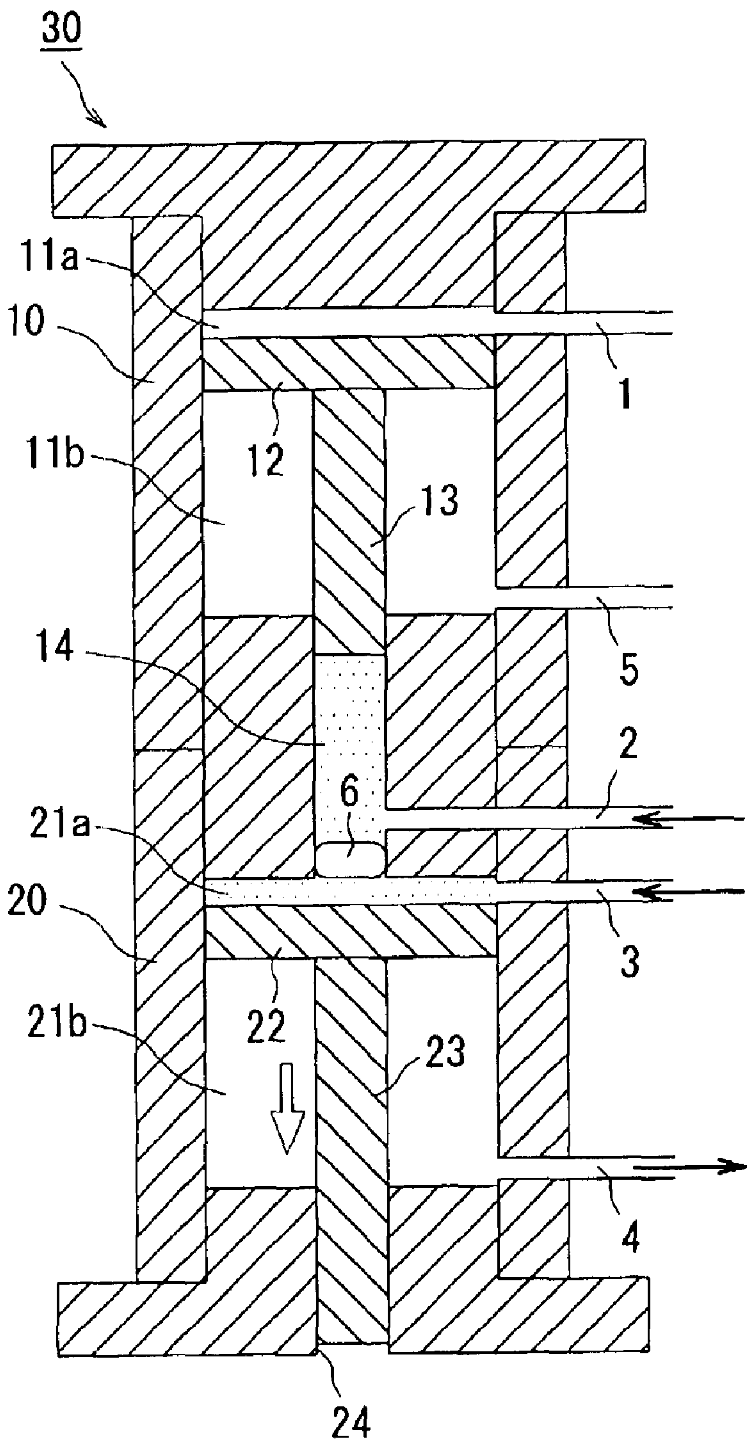
FIG. 2 is a sectional view showing an operation state of the double-acting pressure intensifying cylinder 30 in a first process.

As shown in FIG. 2, the hydraulic fluid (preferably, highly pressured) is supplied into the operation chamber 14 and the second fluid chamber 21 (the cap side 21*a*) through the second fluid supply port 2 and the third fluid supply port 3 with the first fluid supply port 1 to the fourth fluid supply port 4 and the air port 5 kept open. Thus, the second piston 22 is pushed down to a predetermined position or a given position by the hydraulic fluid supplied into the second fluid chamber 21 (the cap side 21*a*). At this time, the hydraulic fluid in the second fluid chamber 21 (the head side 21*b*) is discharged through the fourth fluid supply port 4.

According to the present embodiment, the state in which both the first piston 12 and the second piston 22 are pushed up is a basic state as shown in FIG. 2. The piston 30 preferably starts from this basic state. If the first piston 12 starts to move in a state where the first piston 12 is previously pushed down (in other words, the first piston 12 is not completely pushed up), the rod 13 slides up in the operation chamber 14 by the hydraulic fluid supplied through the second fluid supply port 2 and the first piston 12 is pushed up. At this time, the hydraulic fluid in the first fluid chamber 11 (the cap side 11*a*) is discharged through the first fluid supply port 1 and air is sucked into the first fluid chamber 11 (the head side 11*b*) through the air port 5 (not shown).

(2) Second Process

Figure 3:
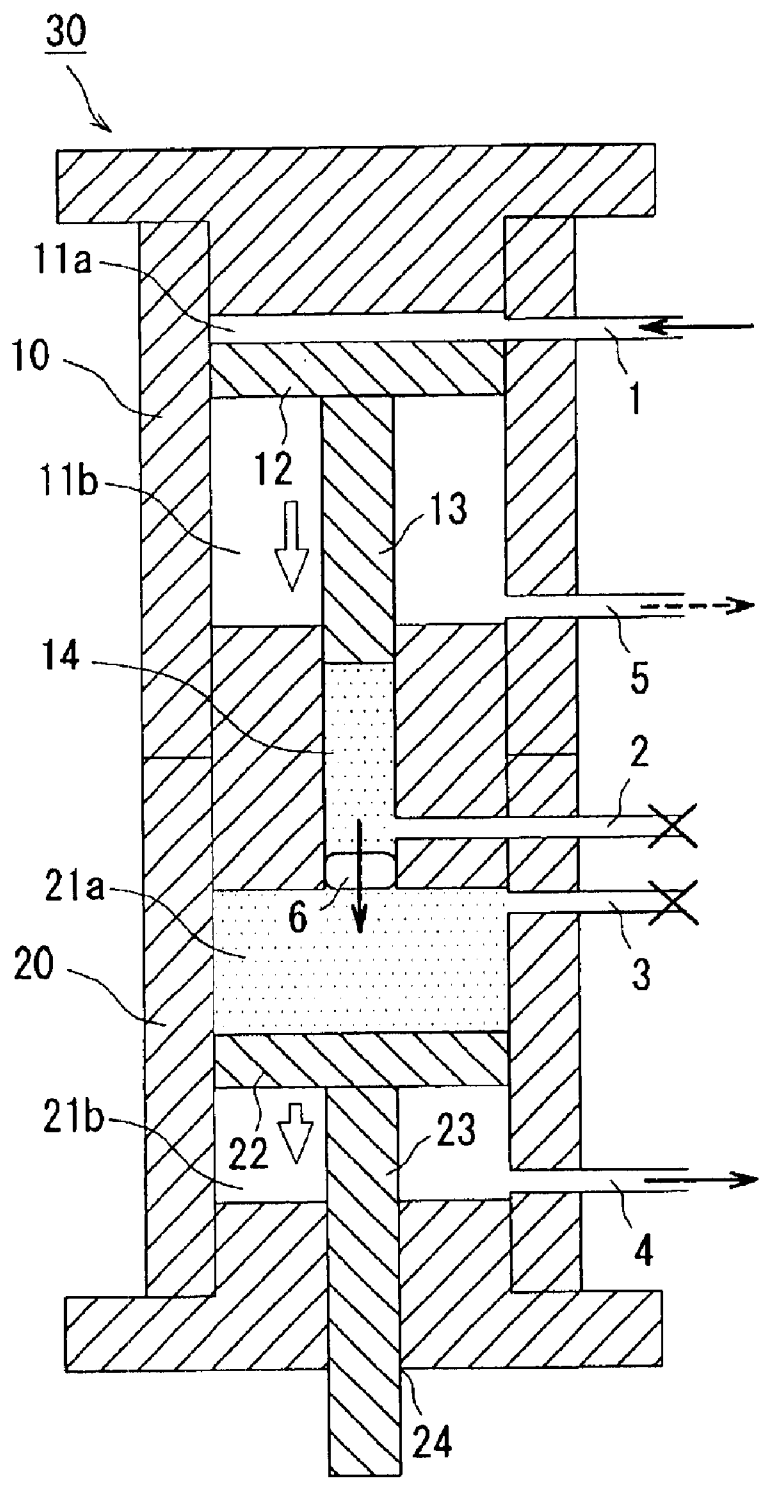
FIG. 3 is a sectional view showing an operation state of the double-acting pressure intensifying cylinder 30 in a second process.

When the second piston 22 is pushed down to a predetermined position or a given position in the first process, the second piston 22 is stopped. As shown in FIG. 3, the second fluid supply port 2 and the third fluid supply port 3 are closed. The hydraulic fluid is supplied into the first fluid chamber 11 (the cap side 11*a*) through the first fluid supply port 1 while the fourth fluid supply port 4 is opened. Thus, the first piston 12 is pushed down and the rod 13 slides down in the operation chamber 14. At this time, air in the first fluid chamber 11 (the head side 11*b*) is discharged through the air port 5. The second piston 22 is also pushed down and the hydraulic fluid in the second fluid chamber 21(the head side 21*b*) is discharged through the fourth fluid supply port 4.

Figure 4:
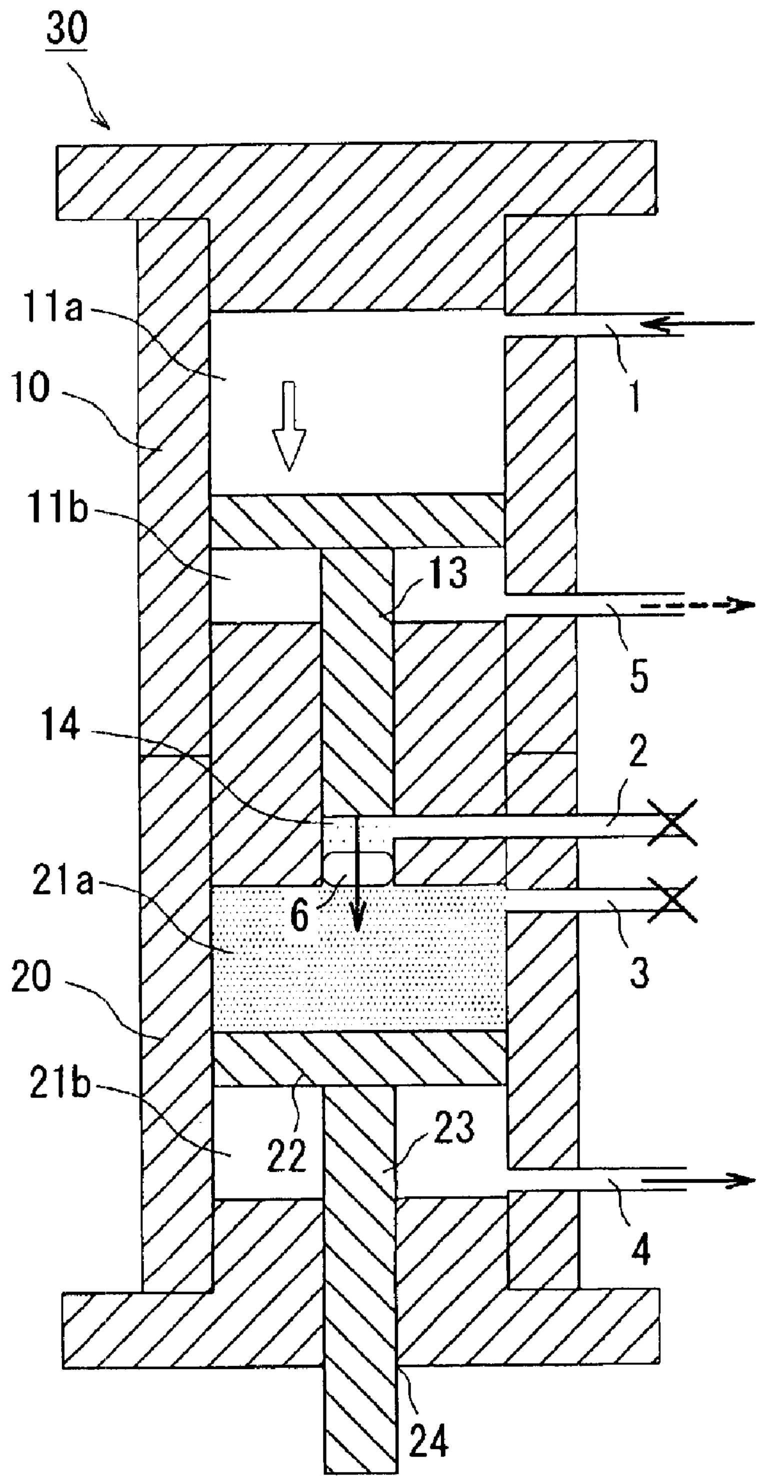
FIG. 4 is a sectional view showing another operation state of the double-acting pressure intensifying cylinder 30 in the second process.

Since the operation chamber 14 and the second fluid chamber 21 (the cap side 21*a*) are filled with the hydraulic fluid, when the hydraulic fluid in the operation chamber 14 is pushed out by the rod 13 and supplied into the second fluid chamber 21 (the cap side 21*a*) through the check valve 6 as shown in FIG. 4, the pressure of the hydraulic fluid in the second fluid chamber 21 (the cap side 21*a*) is intensified. Namely, the pressure-intensified stroke whose pressure is intensified by the amount generally equivalent to the volume of the operation chamber 14 is generated.

(3) Third Process

Figure 5:
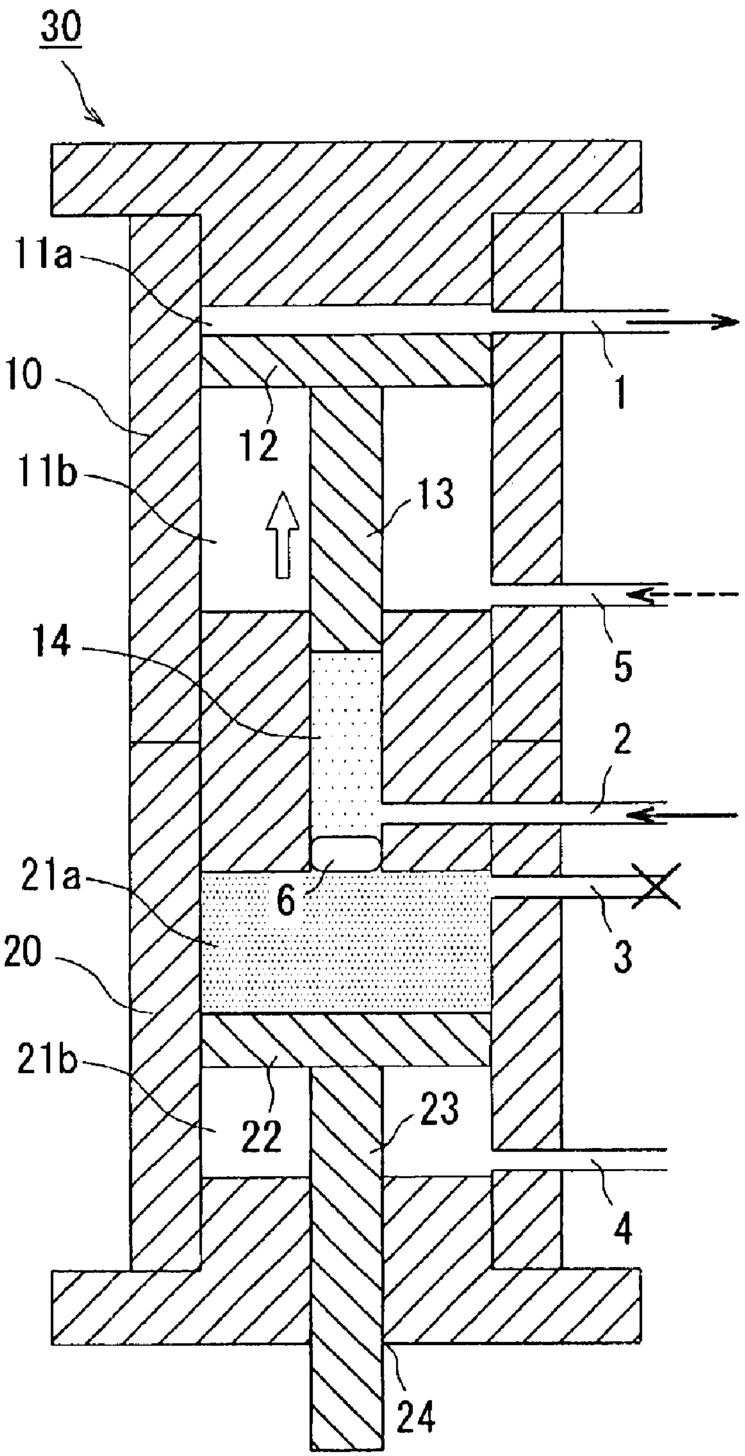
FIG. 5 is a sectional view showing an operation state of the double-acting pressure intensifying cylinder 30 in a third process.

As shown in FIG. 5, the second fluid supply port 2 is opened to supply the hydraulic fluid into the operation chamber 14 through the second fluid supply port 2. Thus, the rod 13 slides up in the operation chamber 14 and the first piston 12 is pushed up. At this time, the hydraulic fluid in the first fluid chamber 11 (the cap side 11*a*) is discharged through the first fluid supply port 1 and air is sucked into the first fluid chamber 11 (the head side 11*b*) through the air port 5. Since the check valve 6 prevents the hydraulic fluid from flowing into the operation chamber 14 from the second fluid chamber 21 (the cap side 21*a*), even if the second fluid supply port 2 is opened, an intensified pressure of hydraulic fluid in the second fluid chamber 21 (the cap side 21*a*) is not reduced. The third fluid supply port 3 remains closed. The fourth fluid supply port 4 remains open. At this moment, the rod 23 does not slide down because the load is applied on the rod 23.

(4) Fourth Process

The second process and the third process described above are repeated until required pressure-intensified stroke is generated.

As shown in FIG. 5, the first piston 12 is pushed up (preferably to the maximum extent). Then as shown in FIG. 3, the second fluid supply port 2 is closed and the hydraulic fluid is supplied again into the first fluid chamber 11 (the cap side 11*a*) through the first fluid supply port 1 with the third fluid supply port 3 kept closed and the fourth fluid supply port 4 kept open. Thus, the first piston 12 is pushed down and the rod 13 slides down in the operation chamber 14. Thus, the hydraulic fluid in the operation chamber 14 is pushed out again by the rod 13 and supplied into the second fluid chamber 21 (the cap side 21*a*) through the check valve 6. Then, as shown in FIG. 4, the hydraulic fluid in the second fluid chamber 21 (the cap side 21*a*) generates the pressure-intensified stroke whose pressure is further intensified by the amount generally equivalent to the volume of the operation chamber 14. As shown in FIG. 5, the second fluid supply port 2 is opened and the hydraulic fluid is supplied again into the operation chamber 14 through the second fluid supply port 2. The rod 13 slides up again in the operation chamber 14 and the first piston 12 is pushed up. By repeating these processes, a required pressure-intensified stroked is appropriately obtained.

Since the first piston 12 serves as a pump by continuously sliding up and down, the pressure of hydraulic fluid in the second fluid chamber 21 (the cap side 21*a*) of the second cylinder 20 can be intensified. Every time the first piston 12 reciprocally slides once, the pressure is intensified by the amount generally equivalent to the volume of the hydraulic fluid filled in the operation chamber 14.

(5) Fifth Process

Figure 6:
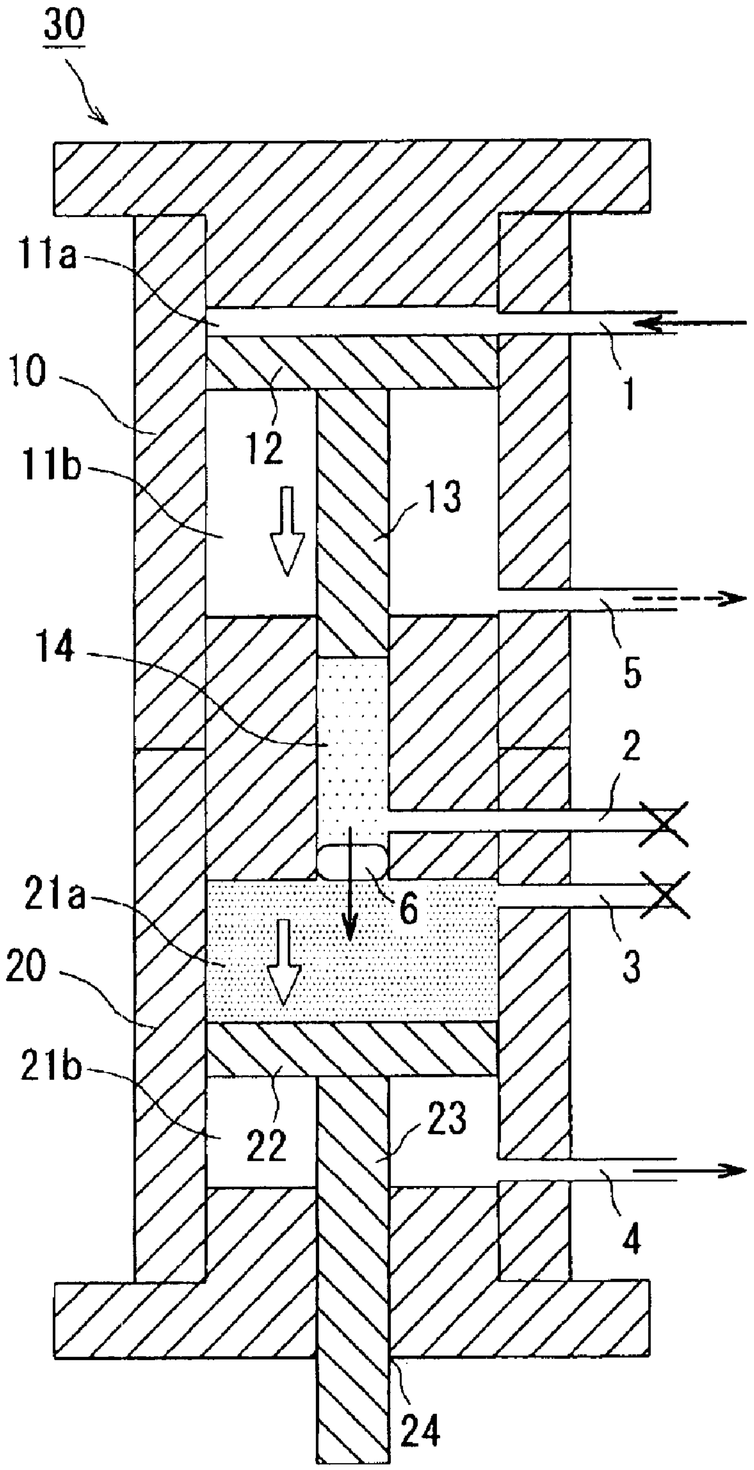
FIG. 6 is a sectional view showing an operation state of the double-acting pressure intensifying cylinder 30 in a fifth process.
Figure 7:
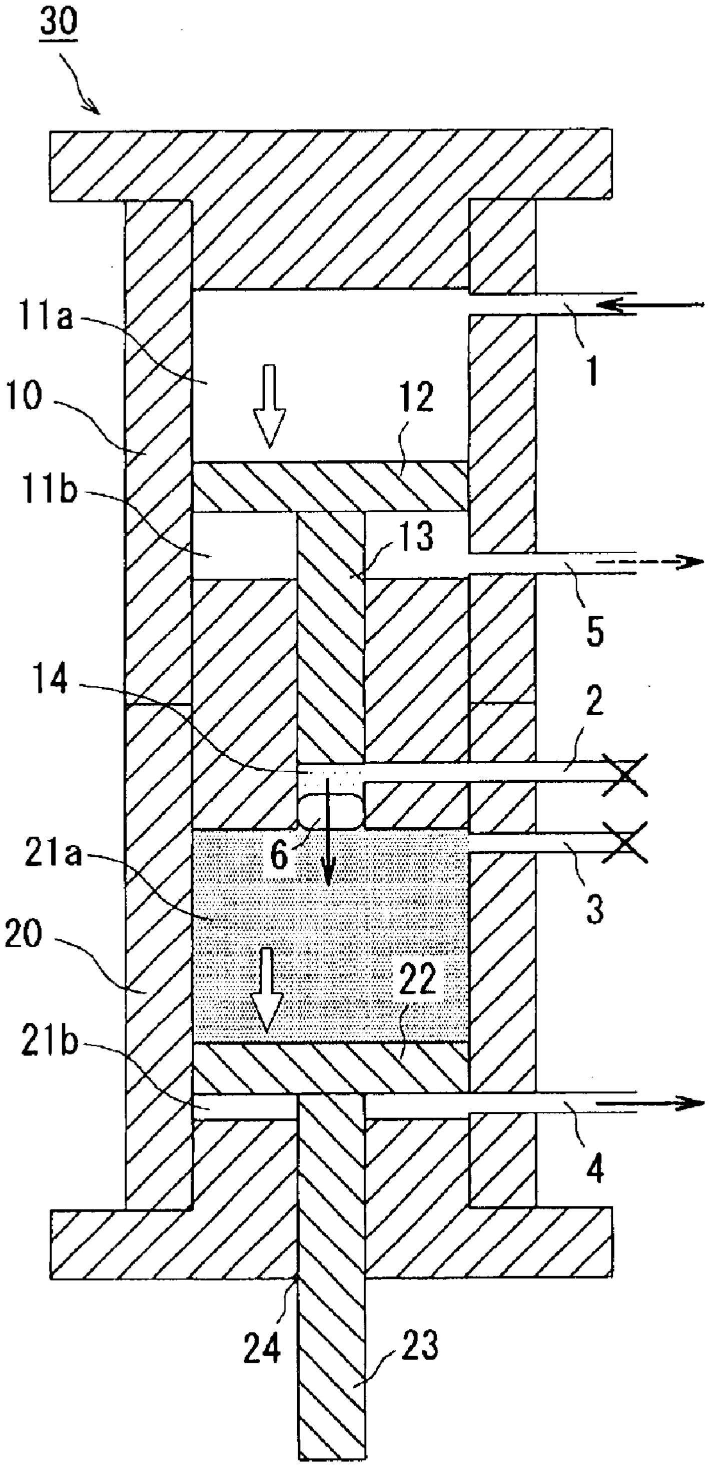
FIG. 7 is a sectional view showing another operation state of the double-acting pressure intensifying cylinder 30 in the fifth process.

After a required pressure-intensified stroke is obtained by repeating the above processes, the hydraulic fluid is supplied into the operation chamber 14 through the second fluid supply port 2 as shown in FIG. 5. The first piston 12 is pushed up (preferably to the maximum extent) and the operation chamber 14 is filled with the hydraulic fluid. As shown in FIG. 6 and FIG. 7, the second fluid supply port 2 is closed and the hydraulic fluid is supplied into the first fluid chamber 11 (the cap side 11*a*) through the first fluid supply port 1. Thus, the first piston 12 is pushed down and the rod 13 slides down in the operation chamber 14. Air in the first fluid chamber 11 (the head side 11*b*) is discharged through the air port 5. Since the fourth fluid supply port 4 is open, the second piston 22 is pushed down by the intensified pressure of hydraulic fluid in the second fluid chamber 21 (the cap side 21*a*) and the pressure of hydraulic fluid in the operation chamber 14. Thus, the rod 23 slides down in the sliding hole 24 and a driving force is transmitted to other mechanisms (not shown) such as a crank shaft connected thereto. However, the third fluid supply port 3 remains closed.

(6) Sixth Process

Figure 8:
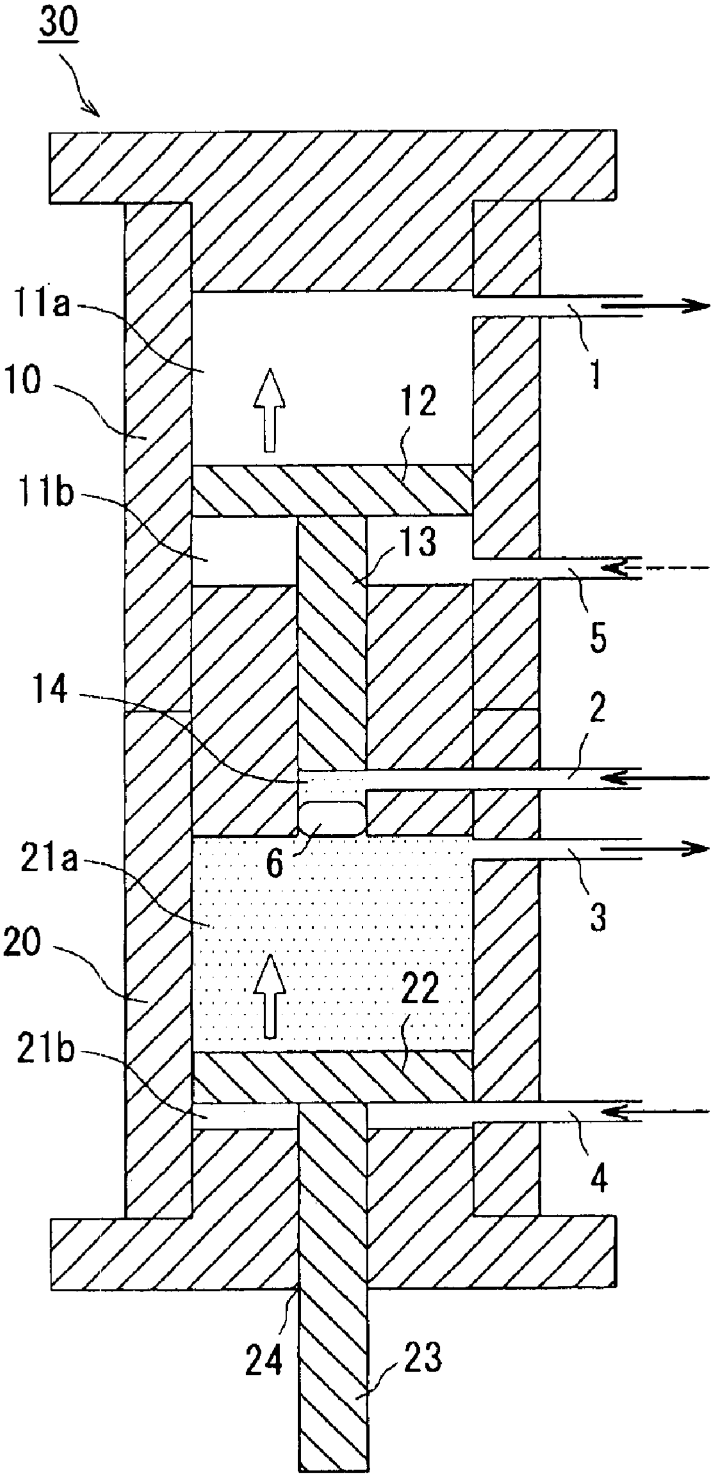
FIG. 8 is a sectional view showing another operation state of the double-acting pressure intensifying cylinder 30 in a sixth process.

After the driving force is transmitted to the crank shaft and the like, as shown in FIG. 8, by opening the second fluid supply port 2 and the third fluid supply port 3 and supplying the hydraulic fluid into the operation chamber 14 and the second fluid chamber 21 (the head side 21*b*) through the second fluid supply port 2 and the fourth fluid supply port 4, the first piston 12 and the second piston 22 are pushed up and return to the basic state (refer to FIG. 2). At this time, the hydraulic fluid in the first fluid chamber 11 (the cap side 11*a*) is discharged through the first fluid supply port 1 and the hydraulic fluid in the second fluid chamber 12 (the cap side 21*a*) is discharged through the third fluid supply port 3. Air is sucked into the first fluid chamber 11 (the head side 11*b*) through the air port 5.

Concretely, as shown in FIG. 1, in a double-acting pressure intensifying cylinder 30 with an inner diameter (an inner diameter of the first cylinder 10: $D_A$, an inner diameter of the second cylinder 20: $D_B$) of 20 cm, with an inner diameter $D_O$ of the operation chamber 14 of 10 cm, with pressure $P_A$ of hydraulic pump of 200 kg/cm$^2$, an intensified pressure $P_O$ in the operation chamber 14 is derived according to the following numerical formula.

$$P_O=(D_A/D_O)^2\times P_A$$

$$P_O=(20/10)^2\times 200$$

$$P_O=800\ \text{kg/cm}^2$$

Accordingly, the pressure Q of the second piston 22 (the rod 23) is derived according to the following numerical formula.

$$Q=\pi/4\times D_B^2\times P_O$$

$$Q=0.785\times 400\times 800$$

$$Q=251{,}200\ \text{kg/cm}^2$$

Or the pressure Q of the second piston 22 (the rod 23) is derived according to the following numerical formula.

$$Q=\pi/4(D_A\times D_B/D_O)^2\times P_A$$

$$Q=0.785\times(20\times 20/10)^2\times 200$$

$$Q=251{,}200\ \text{kg/cm}^2$$

If the sliding scope $L_A$ that the rod 13 of the first piston 12 slides in the operation chamber 14 is 5 cm, the sliding scope S of the second piston 22 by one reciprocating motion of the first piston 12 is derived according to the following numerical formula.

$$S=(D_O/D_B)^2\times L_A$$

$$S=(10/20)^2\times 5$$

$$S=1.25\ \text{cm}$$

Figure 9:
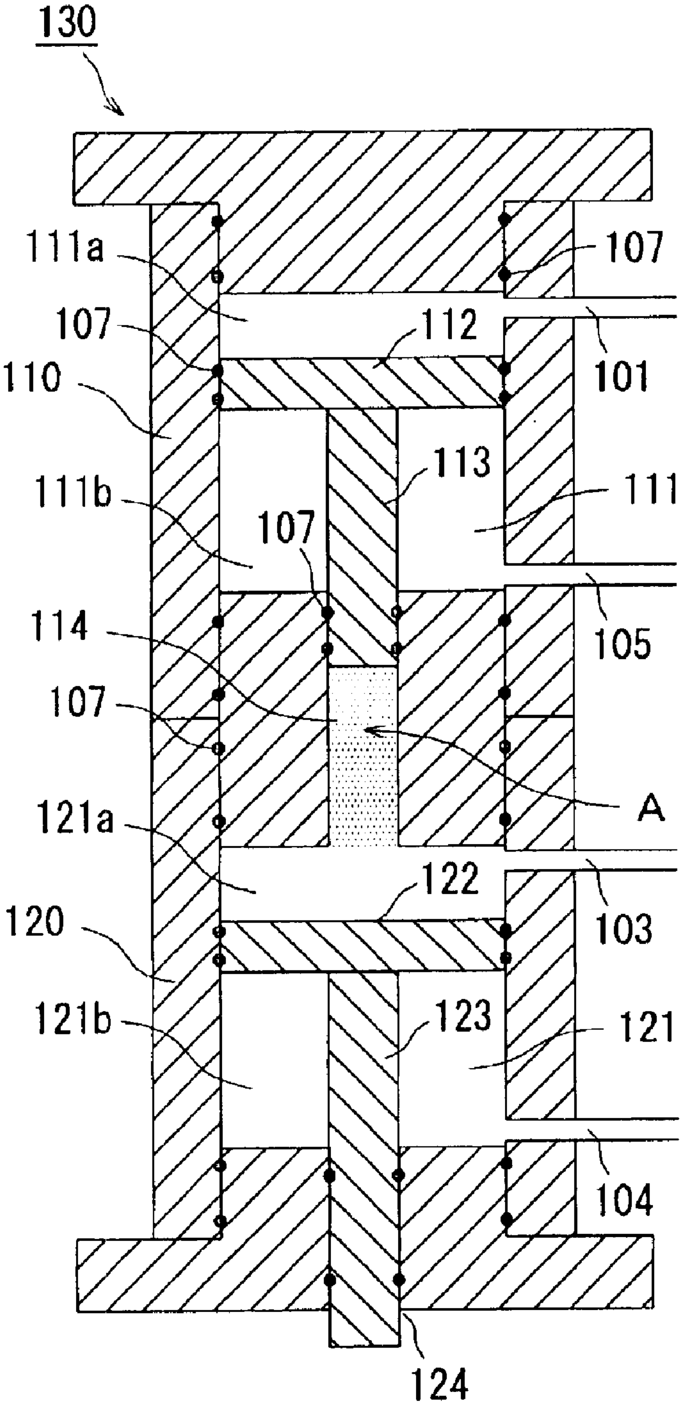
FIG. 9 is a sectional view of a double-acting pressure intensifying cylinder 130 as a comparative example.

Referring to FIG. 9, as a comparative example of the cylinder 30 according to the present embodiment, a cylinder 130 will be described. The cylinder 130 is formed by integrating a hydraulic cylinder and a pressure intensifying device. A first cylinder 110 and a second cylinder 120 are connected in series via an operation chamber 114.

The pressure intensifying cylinder 130 is provided with a first fluid chamber 111 and a second fluid chamber 121. The first fluid chamber 111 is provided with a first piston 112 and the second fluid chamber 121 is provided with a second piston 122. A rod 113 of the first piston 112 is slidably inserted into the operation chamber 114 and a rod 123 of the second piston 122 is slidably inserted into a sliding hole 124. The first fluid chamber 111 is divided into a cap side 111*a* and a head side 111*b* by the first piston 112 and the second fluid chamber 121 is divided into a cap side 121*a* and a head side 121*b* by the second piston 122. A fluid supply port 101 is provided on the cap side 111*a* of the first fluid chamber 111, an air port 105 is provided on the head side 111*b*, a fluid supply port 103 is provided on the cap side 121*a* of the second fluid chamber 121, and a fluid supply port 104 is provided on head side 121*b*. Then, seal members 107 are appropriately provided at sliding positions and the like in the first piston 112, the rod 113 and the first cylinder 110, and at sliding positions and the like in the second piston 122, the rod 123 and the second cylinder 120 to prevent the hydraulic fluid from leaking.

For an operation of the pressure intensifying cylinder 130, a hydraulic fluid is supplied into the cap side 121*a* of the second fluid chamber 121 and the operation chamber 114 through the fluid supply port 103 and the first piston 112 is pushed up. At this time, the fluid supply port 104 is closed and the second piston 122 remains in a stationary state. The fluid supply port 103 is closed and the hydraulic fluid is supplied into the cap side 111*a* of the first fluid chamber 111 through the fluid supply port 101 while the fluid supply port 104 is opened. Thus, the first piston 112 and the second piston 122 are pushed down and a driving force is transmitted to a crank shaft which is connected to the rod 123 of the second piston 122 and other mechanisms. Since a hydraulic fluid A supplied into the operation chamber 114 intensifies the pressure, output is improved as compared to ordinary hydraulic cylinders.

In the case of the cylinder 130, although the pressure of the stroke can be intensified, the pressure can be intensified only by the amount generally equivalent to the volume of the hydraulic fluid A which is supplied into the operation chamber 114. Thus, when trying to obtain higher pressure, it is required to increase equipment size by enlarging an inner diameter of the pressure intensifying cylinder 130 and the like. Therefore, its effect is not so great as that of the cylinder 30 according to the present embodiment.

Since an output of the double-acting pressure intensifying cylinder 30 is intermittent, the cylinder 30 is preferably used for an application in which intermittent movement is required rather than for an application in which smooth movement is required. Particularly, it is preferably used for an application in which a great driving force is required such as for compressing scrap metal or metal powder (for example, iron scrap or iron powder). It is also preferably used for tools such as a pipe bender for bending a pipe and iron.

Effects of the Invention

A double-acting pressure intensifying cylinder has the following effects. Since a pressure from a second cylinder to a first cylinder is cut off by providing a check valve in an operation chamber, a pressure intensified by a pressure transmitted from the operation chamber to the second cylinder is not reduced when the first cylinder slides. Since it is possible to make the first cylinder serve as a pump by continuously sliding the first cylinder, the adjustable pressure-intensified stroke can be obtained and the pressure in the second cylinder can be intensified. Since an adjustable pressure-intensified stroke can be obtained, larger driving force can be obtained with reducing the inner diameter of the cylinder. Therefore downsizing of cylinders is attained. In addition, simple structure makes it possible to be inexpensive and to reduce the rate of the occurrence of trouble such as breakdown. Since it is not necessary to make the rod especially longer, the cylinder 30 is preferably when strength of the rod, bending and the way of support are considered.

A method for intensifying pressure in a cylinder as described has the following effects. By stopping the second cylinder at a given position (an operation starting point) and continuously sliding the first cylinder and make the first cylinder serve as a pump, the adjustable pressure-intensified stroke can be obtained and the pressure in the second cylinder can be suitably intensified. Since an adjustable pressure-intensified stroke can be obtained, larger driving force can be obtained with reducing the inner diameter of the cylinder. Therefore downsizing of cylinders is attained.

The present embodiment of pressure intensifying cylinder should not be confined to the embodiments described, and can be added changes to in the range that does not depart from technical thought of the present invention. The invention is intended to cover all modifications, equivalents and alternative falling within the spirit and scope of the invention as defined by the appended claims.

Although a piston is used as a component which slides reciprocally in the cylinder, presses the fluid and transmits the pressure in this embodiment, a plunger or a ram and the like may be used in place of the piston. In addition, the inner diameters of the first cylinder and the second cylinder are not necessarily the same. The inner diameters may be set to any value. For example, either one of the inner diameters of the first cylinder and the second cylinder may be larger or smaller than the other.

What is claimed is:

1. A double-acting pressure intensifying cylinder comprising: a first cylinder having a first piston;

a second cylinder integrally connected in series to said first cylinder and having a second piston separated from said first piston;

an operation chamber provided in an inner portion of said first cylinder and said second cylinder, having a fluid supply port, and having an inner diameter set to be smaller than inner diameters of said first cylinder and said second cylinder; and a check valve provided within said series connected first and second cylinders at a position which is closer to said second cylinder than to the fluid supply port of said operation chamber and which is between said operation chamber and said second piston so as to make it possible for a fluid to flow only in one direction from said operation chamber to said second cylinder, wherein a rod of said first piston cuts off fluid communication between a fluid chamber of said first cylinder and said operation chamber by sliding in said operation chamber, said second piston is stopped at a predetermined position or a given position, and said rod of said first piston is slid continuously and/or intermittently in said operation chamber, a hydraulic fluid is supplied with an amount generally equivalent to a volume of said operation chamber into said second cylinder through said check valve, whereby every time said first piston reciprocally slides once, a pressure-intensified stroke with pressure intensified by the amount generally equivalent to the volume of said operation chamber is obtained in said second piston.

2. A double-acting pressure intensifying cylinder according to claim 1, further comprises:

a first fluid chamber in said first cylinder is divided into a cap side and a head side by the first piston, a second fluid chamber in said second cylinder is divided into a cap side and a head side by the second piston, wherein said operation chamber is an area where the rod of said first piston slides.

3. A double-acting pressure intensifying cylinder according to claim 1 or 2, further comprises:

a fluid supply port of said operation chamber is a second fluid supply port, a first fluid supply port is provided on the cap side of said first cylinder and an air port is provided on the head side of said first cylinder, a third fluid supply port is provided on the cap side of said second cylinder and a fourth fluid supply port is provided on the head side of said second cylinder.

4. A double-acting pressure intensifying cylinder according to claim 3, wherein:

a hydraulic fluid into a cap side of said first fluid chamber is supplied through said first fluid supply port, air in the head side of said first fluid chamber is discharged through said air port and said first piston is pushed down, the hydraulic fluid in said operation chamber is supplied into the cap side of said second fluid chamber through said check valve, and the pressure in the cap side of the second fluid chamber is intensified.

5. A double-acting pressure intensifying cylinder according to claim 3, wherein:

the hydraulic fluid into said operation chamber is supplied through said second fluid supply port, the hydraulic fluid in the cap side of said first fluid chamber is discharged through said first fluid supply port while air is sucked into the head side of said first fluid chamber through said air port, and then said first piston is pushed up.

6. A double-acting pressure intensifying cylinder according to claim 3, wherein:

the hydraulic fluid supplied into said operation chamber and/or the cap side of said second fluid chamber through said second fluid supply port and/or said third fluid supply port and supplying the hydraulic fluid of said operation chamber into the cap side of said second fluid chamber through the check valve, and the hydraulic fluid in the head side of said second fluid chamber is discharged through said fourth fluid supply port and said second piston is pushed down.

7. A double-acting pressure intensifying cylinder according to claim 3, wherein:

the hydraulic fluid supplied into the head side of said second fluid chamber through said fourth fluid supply port, and the hydraulic fluid in the cap side of said second fluid chamber is discharged through said third fluid supply port and said second piston is pushed up.

8. A double-acting pressure intensifying cylinder according to claim 3, wherein:

the hydraulic fluid filled in the head side of said first fluid chamber, and said air port is changed to a fluid supply port.

9. A double-acting pressure intensifying cylinder according to claim 1, wherein:

a piston provided on said first cylinder and/or said second cylinder is changed to a plunger or a ram.

10. A double-acting pressure intensifying cylinder according to claim 1, wherein:

inner diameters of said first cylinder and said second cylinder are different.

11. A method for intensifying pressure in a cylinder, comprising: connecting a first cylinder having a first piston to a second cylinder having a second piston integrally in series via an operation chamber in an inner portion, separating said first piston and said second piston, cutting off a rod of said first piston between a fluid chamber of said first cylinder and said operation chamber by sliding in said operation chamber, setting an inner diameter of said operation chamber to be smaller than inner diameters of said first cylinder and said second cylinder, providing a fluid supply port on said operation chamber, providing a check valve in the inner portion of said series connected first and second cylinders at a position which is closer to said second cylinder than to the fluid supply port of said operation chamber and which is between said operation chamber and said second piston so as to make it possible for a fluid to flow only in one direction from said operation chamber to said second cylinder, stopping said second piston at a predetermined position or a given position, and sliding the rod of said first piston continuously and/or intermittently in said operation chamber, supplying a hydraulic fluid whose amount is generally equivalent to a volume of said operation chamber into said second cylinder through said check valve, and obtaining a pressure-intensified stroke of which pressure is intensified by the amount generally equivalent to the volume of said operation chamber in said second cylinder every time said first piston reciprocally slides once.

* * * * *